April 18, 1972 K. SCHLOEMER ET AL 3,657,374
RECOVERY OF ISOBUTYLENE FROM MIXTURES CONTAINING
THE SAME AND BUTADIENE
Filed Feb. 26, 1970
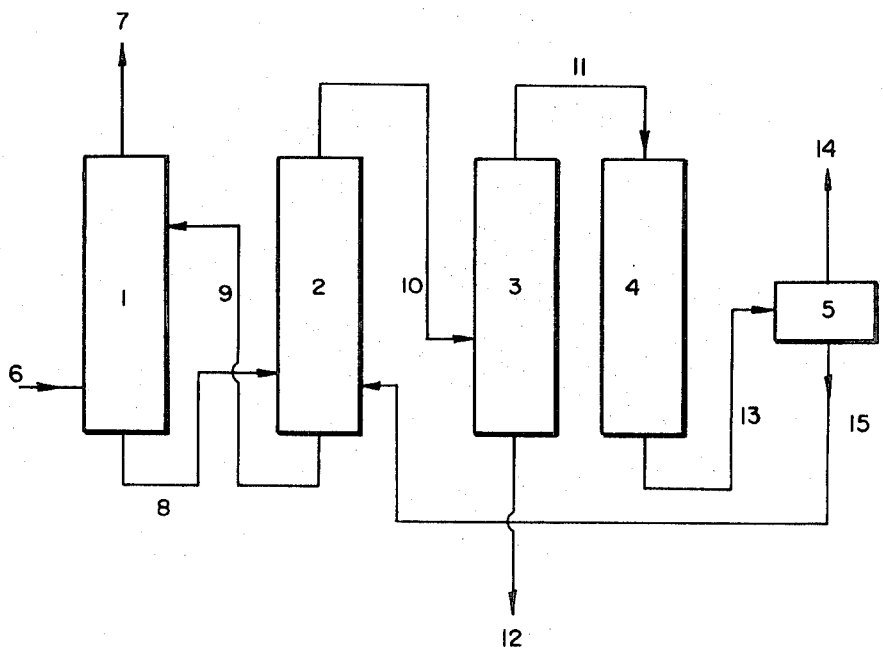
INVENTORS:
KARL SCHLOEMER
OTTO NAGEL
ROLF PLATZ
HANS MARTIN WEITZ
BY
*Johnston, Root, O'Keeffe, Keil, Thompson & Shurtleff*
ATT'YS

United States Patent Office 3,657,374
Patented Apr. 18, 1972

3,657,374
RECOVERY OF ISOBUTYLENE FROM MIXTURES CONTAINING THE SAME AND BUTADIENE
Karl Schloemer, Ludwigshafen, Otto Nagel, Hambach, Rolf Platz, Mannheim, and Hans Martin Weitz, Frankenthal, Germany, assignors to Badische Anilin- & Soda-Fabrik Aktiengesellschaft, Ludwigshafen (Rhine), Germany
Filed Feb. 26, 1970, Ser. No. 14,528
Claims priority, application Germany, Mar. 1, 1969, P 19 10 473.5
Int. Cl. C07c *11/24*
U.S. Cl. 260—677 A                          6 Claims

ABSTRACT OF THE DISCLOSURE

Recovery of isobutylene from mixtures of $C_4$-hydrocarbons by absorption in a mixture of tert-butanol, sulfuric acid and water, recovery of tert-butanol by heating the aqueous solution of tert-butanol in sulfuric acid as an azeotrope with 12% water, fractionation of the said azeotrope and decomposition of the tert-butanol by passing it over alumina at about 300° C.

---

The invention relates to a process for the recovery of very pure isobutylene from $C_4$-hydrocarbon mixtures containing isobutylene and up to 60% of butadiene by absorption of the isobutylene in a dilute sulfuric acid containing tert-butanol and cleavage of the tert-butanol thereby formed and intermediately isolated in contact with aluminum oxide.

A very pure isobutylene is required for polymerization of isobutylene into highly polymerized compounds such as butyl rubber or polyisobutylene. Isolation of the isobutylene from the $C_4$-fractions obtained in various cracking methods offers considerable difficulty. Separation of the isobutylene by distillation or rectification is not possible because of the boiling points of the $C_4$-hydrocarbons being so close together.

Methods are known for separating isobutylene from mixtures which contain n-butane, isobutane, n-butenes and isobutylene. The isobutylene is absorbed in 55 to 75% aqueous sulfuric acid and recovered from the acid solution by heating with or without the addition of water. This method has the great disadvantage that it is only suitable for $C_4$-mixtures which are devoid of butadiene.

When mixtures containing butadiene are used, difficulties arise under the said conditions owing to polymerization of the butadiene. The polymers of butadiene contaminate the end products (isobutylene and raffinate) and have to be separated. Moreover butadiene, which is important for further processing, is partly lost. Moreover it is known for example from German printed application No. 1,257,770 that mixtures containing isobutylene and butadiene can be processed without substantial polymerization of the butadiene by keeping the degree of saturation of the acid extract in the sulfuric acid used for the absorption of isobutylene, i.e. the molar ratio of absorbed olefin to sulfuric acid, above a certain limit. The acid extract is heated in a distillation column and the tert-butanol thus separated is cracked in the same column into isobutylene and water. The purity of isobutylene thus achieved is not adequate for many uses to which isobutylene is put, particularly for the production of high molecular weight polyisobutylene.

It is an object of the invention to provide a process for the recovery of isobutylene from $C_4$-hydrocarbon mixtures which yields extremely pure isobutylene.

It is another object of the invention to provide a process for the recovery of isobutylene which is suitable for the separation of isobutylene from butadiene.

These and other objects and advantages of the invention will be better understood from the following detailed description.

We have found that isobutylene can be recovered particularly advantageously from mixtures of $C_4$-hydrocarbons containing isobutylene and 0.01 to 60% by weight of 1,3-butadiene by absorption of the isobutylene in a mixture of about 2 to about 25% by weight of tert-butanol, about 30 to about 45% by weight of sulfuric acid and about 30 to about 55% by weight of water at 25° to 35° C., isolation of tert-butanol by heating the aqueous sulfuric acid butanol solution as an azeotrope with 12% of water and dehydration of the tert-butanol in contact with aluminum oxide, by fractionating the tert-butanol-water azeotrope isolated from the aqueous sulfuric acid tert-butanol solution but still containing by-products and dehydrating only that fraction of the azeotrope of tert-butanol and water which contains not more than 0.03% by weight of impurities apart from water.

Absorption of the isobutylene from the $C_4$-hydrocarbon mixtures which (apart from isobutylene) contain 0.01 up to about 60% by weight of 1,3-butadiene in a mixture of tert-butanol, sulfuric acid and water may be carried out in a conventional manner. Absorption is carried out at a temperature of about 25° to 35° C. A mixture consisting of about 35 to about 45% by weight of sulfuric acid, about 12 to about 25% by weight of tert-butanol and 30 to 55% by weight of water is used as the absorbent. The concentration of tert-butanol in the absorbent increases by hydration of isobutylene. It is preferred to use in the absorber a mixture having the composition: 15 to 25% by weight of tert-butanol, 35 to 45% by weight of sulfuric acid and the balance water.

Absorption of isobutylene may be carried out at atmospheric pressure. It is advantageous however to use a pressure slightly above atmospheric, for example of from 2 to 5 atmosphers gauge. The $C_4$-hydrocarbon mixture may be contacted with the absorbent in liquid or gaseous phase. It is preferred to carry out the absorption of the $C_4$-hydrocarbons by passing the gaseous hydrocarbons through the absorbent in a bubble column.

When the sulfuric acid solution loaded with tert-butanol is heated, the tert-butanol is distilled off as an azeotrope with about 12% of water up to a residual content of about 5% of tert-butanol. It is advantageous to raise the temperature in the bottoms to about 50° to 60° C. The absorbent partly freed from butanol may be used again for the absorption.

In the absorption of isobutylene from a $C_4$-hydrocarbon mixture in aqueous sulfuric acid containing tert-butanol, n-butenes and 1,3-butadiene are also absorbed to a certain extent. In the recovery of the isobutylene by heating the acid absorbent, therefore, not only is tert-butanol obtained but also sec-butanol and 1-buten-3-ol. In the subsequent dehydration these give the corresponding n-butenes and butadiene.

In accordance with the invention, the said tert-butanol-water azeotrope containing the said impurities is recitified and only that fraction is supplied to dehydration over active aluminum oxide which (in addition to the tert-butanol-water azeotrope and any additional water) does not contain more than 0.03% of impurities. It is surprising that such a fractionation is possible at all because in view of general observations such as are given for example by R. H. Ewell in Ind. Eng. Chem., 36, 870–875 (1944), it would have been expected that with the close relationship of the $C_4$-alcohols, tertiary azeotropes would form which could not be separated by distillation.

The subsequent dehydration of the fraction containing tert-butanol and water is carried out by a conventional method by passing it over active aluminum oxide at a temperature of 250° to 350° C.

The process will be described, in an embodiment given by way of example, with reference to the drawing which shows diagrammatically equipment suitable for carrying out the process. A $C_4$-hydrocarbon mixture which has approximately the following composition:

|  | Percent by weight |
|---|---|
| Isobutylene | 15 to 55 |
| n-Butenes | 10 to 45 |
| Butanes | 5 to 15 |
| Butadiene-(1,3) | 0.01 to 60 | is supplied through line 6 to an absorber 1 which, in a steady state, contains a mixture of 15 to 25% by weight of tert-butanol, 30 to 45% by weight of sulfuric acid and 30 to 55% of water. And the same time a mixture of sulfuric acid, water and tert-butanol is supplied through line 9. The proportions are chosen so that (taking into account the tert-butanol formed in the absorption of isobutylene) the composition of the mixture of tert-butanol, sulfuric acid and water given above is set up. It is advantageous to keep the concentrations in the absorber approximately constant. The hydrocarbon mixture is mixed well with the acid absorbent in absorber 1. The solution having a higher concentration of tert-butanol than the mixture of tert-butanol, sulfuric acid and water supplied to the absorber flows through line 8 to a sulfuric acid stripper 2. The $C_4$-hydrocarbons which have been substantially freed from isobutylene leave through line 7. They contain the amounts of the butadiene introduced given in the Table 1 in dependence on the reaction conditions.

TABLE 1

| Absorbent, percent by wt.: | | | | | |
|---|---|---|---|---|---|
| Sulfuric acid | 35 | 35 | 45 | 50 | 50 |
| Tert-butanol | 20 | 20 | 15 | 10 | |
| Water | 45 | 45 | 40 | 40 | 50 |
| Temperature, °C | 30 | 50 | 30 | 30 | 30 |
| Butadiene recovered; percent of amount introduced | 99.7 | 93.5 | 99.4 | 98.6 | 91.1 |

In the sulfuric acid stripper 2, the tert-butanol is distilled off as an azeotrope with about 12% of water from the acid absorbent down to a residual content of about 5% by heating to about 50° to 60° C. at subatmospheric pressure, e.g. at 30 to 100 mm. Hg. The asorbent flows back into the absorber through line 9.

The azeotrope of tert-butanol and water which leaves at the top of the sulfuric acid stripper 2 and which contains a small amount of sec-butanol and methyl vinyl carbinol is supplied through line 10 to a tert-butanol column 3 having about 50 to 70 theoretical trays. The crude product is fractionated in this column 3 atm. abs. a temperature of from 70° to 80° C. A mixture of the aezotrope of tert-butanol and water and impurities is obtained as the bottoms. Pure tert-butanol/water azeotrope is taken overhead and passed through line 11 to a dehydration zone 4. Cracking into isobutylene and water takes place here at a temperature of from about 250° to 350° C., in contact with aluminum oxide. The mixture of isobutylene and water leaving the dehydration zone is condensed and passed through line 13 into a separating vessel 5. The water is separated and returned to the sulfuric acid stripper 2. The isobutylene is withdrawn as a liquid through line 14. If necessary the product is rectified to separate small amounts of products which have not been dehydrated and diisobutylene. The isobutylene contains not more than 0.02% by weight of n-butenes and 0.004% by weight of butadiene.

The following examples illustrate the invention.

EXAMPLE 1

50 kg. of a hydrocarbon mixture having the composition given in column 2 of Table 2 flows per hour through line 6 into an apparatus such as is shown diagrammatically in the drawing. At the same time 73.65 kg. of a mixture consisting of 40.6% of sulfuric acid, 4.75% of tert-butanol and 54.65% of water is supplied at a temperature of 30° C. through line 9. The gas is mixed with the absorbent in the absorber. 85 kg./hour of the absorption mixture having the composition: 21.8% by weight of tert-butanol, 35.2% by weight of sulfuric acid and 43% of water is withdrawn through line 8 into the sulfuric acid stripper 2. The $C_4$ hydrocarbons substantially freed from isobutylene leave through line 7. They contain more than 99% of the amount of butadiene fed in.

The tert-butanol is distilled off as an azeotrope with about 12% of water at a temperature of 50° C. in the sulfuric acid stripper 2. 4.75% by weight of tert-butanol remains in the absorbent. The bottoms from the sulfuric acid stripper flows through line 9 back to the absorber 1. Water used up in the hydration and azeotrope formation is replenished through line 15. 15 kg. of an azeotrope of tert-butanol and water with a small amount of impurities is obtained per hour at the top of the sulfuric acid stripper. The product is supplied through line 10 to column 3 having sixty bubble trays. The azeotrope of tert-butanol and water is fractionated therein at atmospheric pressure. The bottoms product is about 0.1 kg. per hour of a mixture of the azeotrope of tert-butanol and water and impurities and this is drawn off. A pure tert-butanol/water azeotrope is obtained at the top of the column. This is then passed over active aluminum oxide which is kept at a temperature of 300° C. in the form of pellets in a reaction tube 4 and spilt therein into isobutylene and water. The mixture of isobutylene and water leaving the reaction tube 4 is condensed by cooling and separated in a separating vessel 5. The water (5.7 kg. per hour) flows through line 15 back into the sulfuric acid stripper 2. The isobutylene has the composition given in column 4 of the following Table 2.

When for comparison the top product obtained from the sulfuric acid stripper 2 is passed immediately without fractionation in column 3 over the aluminum oxide catalyst in the reaction tube 4 under otherwise identical conditions, an isobutylene is obtained which has the composition given in column 5 of the following Table 2.

In the following Table 2, column 2 gives the compoistion of the $C_4$-mixture used in percent by weight
column 3 gives the composition of the raffinate in percent by weight
column 4 gives the analysis of the isobutylene in percent by weight
column 5 gives the analysis of the isobutylene without rectification of the azeotrope in percent by weight.

TABLE 2

| 1 | 2 | 3 | 4 | 5 |
|---|---|---|---|---|
| Isobutane | 1.4 | 1.81 | <0.002 | <0.002 |
| n-Butane | 4.0 | 5.18 | <0.002 | <0.002 |
| Butene-(1) | 14.2 | 18.26 | 0.003 | 0.03 |
| Trans-butene-(2) | 3.7 | 4.75 | 0.002 | 0.02 |
| Cis-butene-(2) | 2.3 | 2.97 | 0.003 | 0.05 |
| Isobutylene | 25.1 | 3.24 | 99.98 | 99.46 |
| Butadiene-(1,3) | 49.3 | 63.79 | 0.0004 | 0.44 |
| $C_4$-hydrocarbon throughput in kg./hour | 50 | 38.6 | 11.25 | 11.31 |

EXAMPLE 2

The procedure of Example 1 is followed but a $C_4$-hydrocarbon mixture is used having the composition given in column 2 of the following Table 3 under otherwise identical conditions. A raffinate and an isobutylene are obtained whose compositions are given in columns 3 and 4 and, without rectification of the azeotrope, in column 5. Columns 2 to 5 have the same meanings as in Table 2.

TABLE 3

| 1 | 2 | 3 | 4 | 5 |
|---|---|---|---|---|
| Isobutane | 1.8 | 2.75 | <0.002 | <0.002 |
| n-Butane | 8.3 | 12.7 | <0.002 | <0.002 |
| Butene-(1) | 24.3 | 37.11 | 0.004 | 0.03 |
| Trans-butene-(2) | 9.6 | 14.63 | 0.003 | 0.03 |
| Cis-butene-(2) | 6.4 | 9.74 | 0.007 | 0.05 |
| Isobutylene | 36.3 | 2.76 | 99.8 | 99.83 |
| Butadiene-(1,3) | 13.3 | 20.31 | 0.0003 | 0.06 |
| $C_4$-hydrocarbon troughput in kg./hour | 50 | 32.66 | 17.2 | 17.25 |

We claim:

1. A process for the recovery of isobutylene from a crude mixture of $C_4$-hydrocarbons containing isobutylene and 0.01 to 60% by weight of butadiene, which process comprises:

absorbing the isobutylene from said crude mixture in an acid absorbent consisting essentially of about 2 up to about 25% by weight of tert-butanol, about 30 up to about 45% by weight of sulfuric acid and about 30 up to about 55% by weight of water at a temperature of about 25° C. to 35° C.;

heating the resulting aqueous sulfuric acid solution of tert-butanol to distill off and isolate said tert-butanol as an azeotrope with 12% water;

fractionally distilling the azeotrope of tert-butanol and water which has been isolated from said aqueous sulfuric acid solution and which still contains by-product impurities; and dehydrating only that distilled fraction of said azeotrope of tert-butanol and water which contains not more than 0.03% by weight of impurities, aside from water, in contact with active aluminum oxide as the dehydrating catalyst at an elevated temperature of 250° C. to 350° C.

2. A process as claimed in claim 1 wherein said acid absorbent contains about 35 to about 45% by weight of sulfuric acid, about 12 to about 25% by weight of tert-butanol and 30 to 55% by weight of water.

3. A process as claimed in claim 1 wherein said acid absorbent contains 15 to 25% by weight of tert-butanol, 35 to 45% by weight of sulfuric acid and the balance water.

4. A process as claimed in claim 1 wherein said absorption is carried out at about 1 to 5 atmospheres.

5. A process as claimed in claim 1 wherein said azeotrope is distilled off at a bottoms temperature of about 50° C. to 60° C.

6. A process as claimed in claim 1 wherein said absorption is carried out by passing the gaseous hydrocarbons through the absorbent in a bubble column.

References Cited

UNITED STATES PATENTS

| 2,581,065 | 1/1952 | Arnold | 260—677 |
| 3,164,641 | 1/1965 | Bazzarin. | |
| 2,771,497 | 11/1956 | Hunt et al. | 260—677 |
| 3,005,856 | 10/1961 | Gislon et al. | 260—677 |
| 2,424,186 | 7/1947 | Packie et al. | 260—677 |

DELBERT E. GANTZ, Primary Examiner

J. M. NELSON, Assistant Examiner